United States Patent [19]
Feltz

[11] 3,890,853
[45] June 24, 1975

[54] GEAR MECHANISM FOR PRODUCING PERIODIC ROTATION

[75] Inventor: Albert John Feltz, Rochester, N.Y.

[73] Assignee: The Singer Company, New York, N.Y.

[22] Filed: July 31, 1974

[21] Appl. No.: 493,354

[52] U.S. Cl. .................... 74/435; 74/84; 74/413; 74/462
[51] Int. Cl.²...F16H 55/04; F16H 1/06; F16H 55/06; F16H 27/04
[58] Field of Search ............... 74/435, 413, 462, 84

[56] References Cited
UNITED STATES PATENTS
3,220,279  11/1965  Dareing ........................ 74/462
3,813,952  6/1974  Fehrenbacher .................. 74/84

Primary Examiner—Leonard H. Gerin

[57] ABSTRACT

A gear mechanism for producing jam free periodic output rotation from a continuously rotating input source includes a rotatable ring gear having along its inside diameter at least one lead-in-tooth for each direction of input rotation with an asymmetrically pointed profile, and a rotatable pinion gear having radially outward extending symmetrically pointed teeth mounted for engagement with the ring gear.

10 Claims, 5 Drawing Figures

PATENTED JUN 24 1975

3,890,853

SHEET 1

GEAR MECHANISM FOR PRODUCING PERIODIC ROTATION

BACKGROUND OF THE INVENTION

1. Field of the Invention

The invention relates to gear mechanisms for producing a jam-free periodic output rotation from a continuously rotating input source employing a driving ring gear having radially inward extending teeth along a segment of its inside diameter and a driven pinion gear having radially outward extending teeth.

2. Prior Art

There is a need for a device whose reliability produces periodic output rotation from a rotating input source. The rotating input source may be either continuous or non-continuous. An exemplary need requiring conversion of continuous rotating input into a periodic rotating output is the periodic advancing of strip material, such as wire, through two pinched rollers. Continuous input rotation is inputted into a device whose output is the periodic rotation necessary to rotate one of the pinched rollers and thereby periodically advance the strip material through the rollers. An exemplary need requiring conversion of a noncontinuous rotating input into a rotating output which is a fraction of the input rotation is in the setting of the upper film loop of a motion picture projector. Sub-revolution input rotation derived from actuation of the film setting lever is inputted into a device which output is a rotational fraction of the input rotation. This output rotation is then used to set the upper film loop.

Devices capable of generating periodic mechanical rotation from a rotating input source include clutches, and gear mechanisms. Prior art gear mechanisms for producing periodic mechanical rotation generally include a continuously rotating spur gear having a segment of its outside diameter with teeth and a segment without teeth. A rotatable driven spur gear is so located as to engage the teeth of the driving gear. As the driving gear rotates, the first tooth of the toothed segment, known as the lead-in tooth and successive teeth thereafter known as the trailing teeth, engage, rotate, and disengage the driven gear, producing periodic output rotation of the driven gear.

One problem associated with such gear mechanisms is jamming. Jamming is the misengagement of the teeth of the two gears which can cause stalling, tooth deformation, breakage, and excessive wear. One type of tooth misengagement is tooth tip to tooth tip jamming where the tip of the lead-in tooth on the driving gear contacts the tip of a tooth on the driven gear preventing tooth-face to tooth-face contact. Where the two gears are spur gears as in the prior art gear mechanisms the relative motion of the tooth tips is such that forces present at the tooth tips cause high tooth tip to tooth tip friction forces which sustain and encourage the tooth tip to tooth tip jam and prevent the gears from slipping into a tooth-face to tooth-face relationship. Another type of misengagement is "bridge" jamming where the tip of the lead-in tooth on the driving gear contacts the face near the tip of a tooth on the driven gear and the tip of the next adjacent tooth on a driving gear engages the face near the tip of the next adjacent tooth on the driven gear. In this instance, the two adjacent teeth of the driving gear "bridge" two adjacent teeth of the driven gear preventing tooth-face to tooth-face contact. Where the two gears are spur gears, as in the prior art gear mechanisms, the relative motion of the tooth tips is such that forces present at the tooth tips cause high tooth tip to tooth tip friction forces which sustain and encourage the bridging jam and prevent the gears from slipping into a tooth-face to tooth-face relationship.

Jamming is undesirable in that it may damage or stall the gear mechanism. Where the power being transmitted by the gears is large in relation to the gear size, the driving gear could continue to drive despite the jam, possibly causing damage by breaking, bending or disfiguring the teeth on either or both the driving gear and the driven gear. Where the power being transmitted by the gears is amall in relation to the gear size, the gear to gear jam could stall the power source.

An object of this invention is to provide a gear mechanism for producing jam free periodic output rotation from a continuously rotating input source.

Another object of this invention is to provide a gear mechanism where the possibility of a bridging jam is eliminated.

Still another object of this invention is to provide a gear mechanism where the probability of a tooth tip to tooth tip jam is minimized.

A further object of this invention is to provide a gear mechanism where the relative motion of the tooth tips of the two gears is such that the gears are encouraged to slip into a tooth-face to tooth-face relationship should tooth tip to tooth tip contact occur.

SUMMARY OF THE INVENTION

A gear mechanism for producing jam free periodic output rotation from a continuously rotating input source in accordance with the present invention includes a rotatable driving ring gear and a rotatable driven pinion gear. The driving ring gear has along its inside diameter at least one lead-in tooth for each direction of input rotation having a leading face and a trailing face and which is asymmetrically pointed in the direction of input rotation. Depending on the degrees of periodic angular output displacement desired, trailing teeth having shortened addendums may be located on the inside diameter of the ring gear at regularly spaced intervals from the trailing face of the lead-in tooth. The driven pinion gear is mounted for engagement with the ring gear and has radially outward extending gear teeth with symmetrically pointed profiles.

As the driving ring gear rotates, the leading face of the asymmetrically pointed lead-in tooth engages a symmetrically pointed tooth on the pinion gear and causes the pinion gear to rotate. The relative motion of the tip of the lead-in tooth with respect to the tip of a tooth on the pinion gear is such that the two gears are encouraged to slip into a tooth-face to tooth-face engagement should tooth tip to tooth tip contact occur.

BRIEF DESCRIPTION OF THE DRAWINGS

The present invention will be fully understood from a consideration of the following detailed description taken in conjunction with the accompanying drawings in which like reference characters refer to like parts in the several views, and wherein.

DESCRIPTION OF THE PREFERRED EMBODIMENT

Figure 2:
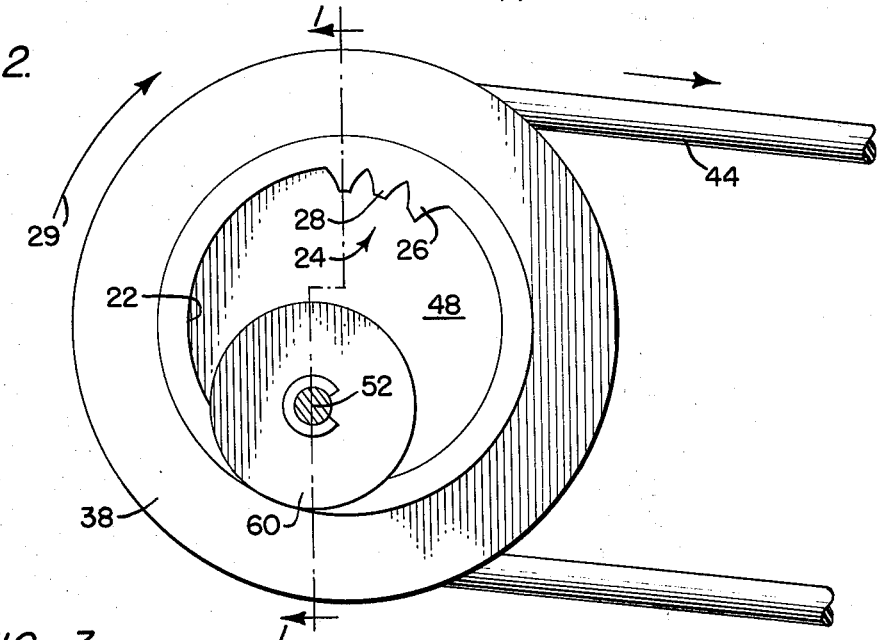
FIG. 2 is a cross section view of the apparatus shown in FIG. 1 taken along line 2—2.
Figure 3:
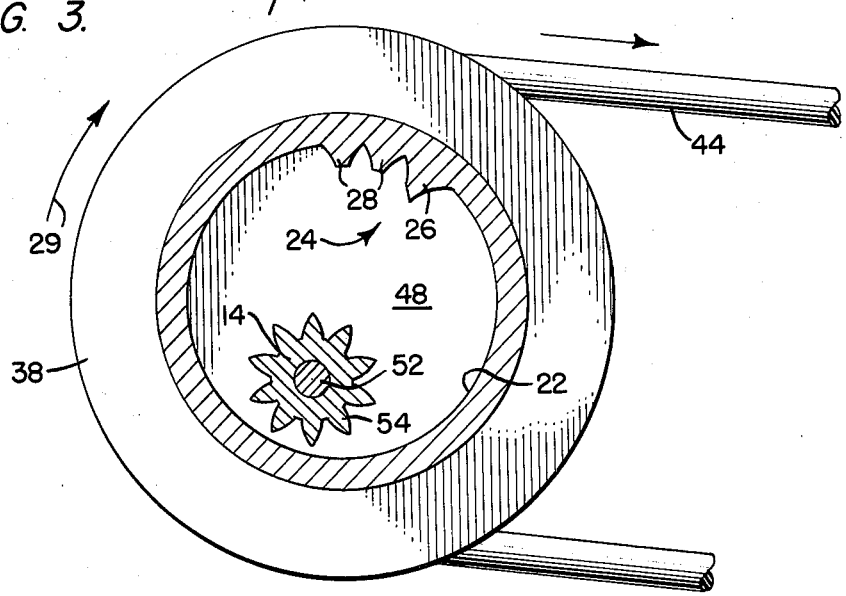
FIG. 3 is a cross section view of the apparatus shown in FIG. 1 taken along line 3—3.

As shown on the accompanying drawings, a gear mechanism in accordance with the present invention includes a ring gear 12, a pinion gear 14, and a bearing 16. As can best be seen in FIG. 1, the ring gear 12, which may be fabricated from any suitable material, such as nylon, includes a gear portion 18 at a first end and a pulley portion 20 at the second end. As can best be seen in FIG. 3, at least one segment 22 without teeth and at least one segment 24 with teeth are located on the inside diameter of the gear portion 18. A lead-in tooth 26, and trailing teeth 28 are located within the segment 24 with teeth. The lead-in tooth 26 is located at one end of the segment 24 with teeth, and the trailing teeth 28 are located at regularly spaced intervals from the lead-in tooth 26. The lead-in tooth 26 is the first tooth to engage the pinion gear 14 during clockwise rotation of the ring gear 12. Clockwise rotation is indicated by the arrow 29 in FIG. 2, FIG. 3 and FIG. 4. As can best be seen in FIG. 4, the lead-in tooth 26 has a leading face 36, a trailing face 32, and an asymmetrically pointed profile. The leading face 36 first contacts the pinion gear 14 during clockwise rotation of the ring gear 12. The lead-in tooth is asymmetrically pointed in the same direction as the input rotation direction. The asymmetrical profile can be formed by modification of the existing tooth profile. By way of example, a chamfer 30 can be located on the trailing face 32. The chamfer 30 starts at the intersection of the trailing face 32 and the base circle 34 and extends to the leading face 36. The chamfer 30 may start at the intersection of the trailing face 32 and a circle whose diameter is larger than the base circle 34 if the resultant gear action is not degraded.

The trailing teeth 28 have shortened addendums to prevent interference between the trailing teeth 28 and the long addendum teeth of the pinion gear 14, as will be described below. By way of example, shortening may be accomplished by truncating each trailing tooth 28 at the base circle 34. The trailing teeth 28 may be truncated at a circle whose diameter is larger than the base circle 34 if the resultant gear action is not degraded. The number of trailing teeth 28 placed adjacent to the lead-in tooth 26 depends on the amount of angular output displacement desired. If less angular output displacement than is provided by the trailing teeth 28 is desired, one or both trailing teeth 28 may be eliminated. If more angular output displacement than is provided by the trailing teeth 28 is desired, additional trailing teeth 28 may be added.

Figure 1:
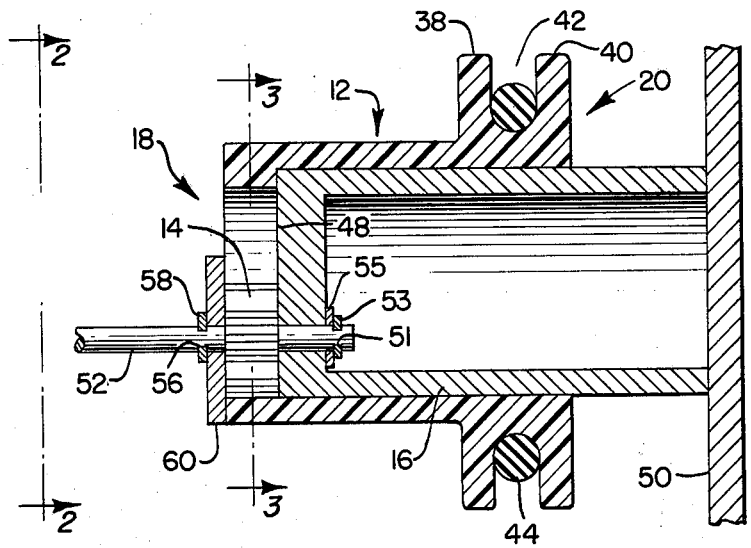
FIG. 1 is a longitudinal cross section view of a preferred embodiment of the present invention.

As can best be seen in FIG. 1, a flange 38 and a flange 40 extend radially outward from the outside diameter of the second end of the ring gear 12 and define a groove 42. A power transmission means 44 is located within the groove 42 to drive the ring gear 12. By way of example, the power transmission means 44 may include an elastic "O" ring.

The bearing 16, which may be fabricated of any suitable material, including sintered bronze, is located within the second end of the ring gear 12. The outside diameter of the bearing 16 and the inside diameter of the second end of the ring gear 12 are dimentioned to allow relative rotation between the bearing 16 and the ring gear 12. A thrust face 48 at a first end of the bearing 16 abuts the teeth at the first end of the ring gear 12. The second end of bearing 16 is affixed by any well known means to a support means 50. By way of example, the bearing 16 may be in threaded engagement with, welded to, upset riveted to or pressed into a bore in the support means 50.

A shaft 52 mounted for relative rotation within a bore in bearing 16 extends axially from the thrust face 48. A recess 51 at one end of the shaft 52 acts in cooperation with the lock ring 53 and the thrust washer 55 to restrict axial displacement of the shaft 52. The other end of the shaft 52 is connected with the driven means (not shown) such as one roller in a set of two pinched rollers.

The pinion gear 14, which may be fabricated from any suitable material, including nylon, has an annular body and a plurality of equally spaced gear teeth 54 extending radially outward of the annular body and is press fitted onto the shaft 52. The gear teeth 54 are pointed to minimize the surface area at the tip of the tooth. By way of example, the pointing may be accomplished by allowing the tooth profile to extend until a point is formed.

As can best be seen in FIG. 1, a flange 60 extends radially outward from a first end of the pinion gear 14. A recess 56 located on the shaft 52 acts in cooperation with a lock ring 58 and the flange 60 to further restrict axial displacement of the shaft 52 and the pinion gear 14. The shaft 52 is so located as to permit engagement between the pinion gear 14 and the ring gear 12.

Figure 4:
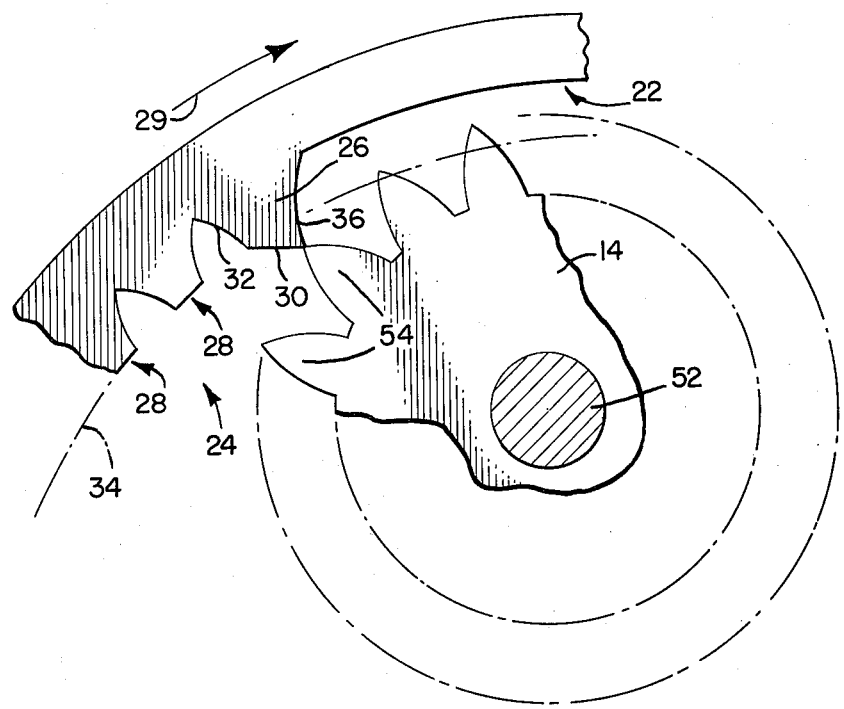
FIG. 4 is a view showing the lead-in tooth on the driving gear engaging a tooth on the driven pinion gear and, FIG. 5 is a view of a second embodiment of the present invention.

As can best be seen in FIG. 4, as the ring gear 12 rotates, the lead-in tooth 26 approaches a tooth 54 on the pinion gear 14. During the approach, the relative motion of the lead-in tooth 26, with respect to a tooth 54 on the pinion gear 14, is such that the tip of the lead-in tooth 26 tends to pass the tip of a tooth 54 on the pinion gear 14. By way of perspective, this passing motion is to be contrasted to the radially inward motion between two approaching tooth tips on two spur gears. In the event the tip of the lead-in tooth 26 contacts the tip of a tooth 54 on the pinion gear 14, the relative passing motion allows the two tips to slip into a tooth-face to tooth-face relationship. The trailing teeth 28 have shortened addendums to minimize interference with the long addendum teeth 54 of the pinion gear 14.

As the rotating ring gear 12 engages the pinion gear 14, power is transmitted to the pinion gear 14 and to the output shaft 52 to the driven means (not shown).

It is understood that the word "tooth" as used herein includes spur teeth where the axis of a tooth is parallel to the rotational axis of the gear and other types of gear teeth where the axis of the tooth is at some angle to the axis of rotation such as helical teeth.

Figure 5:
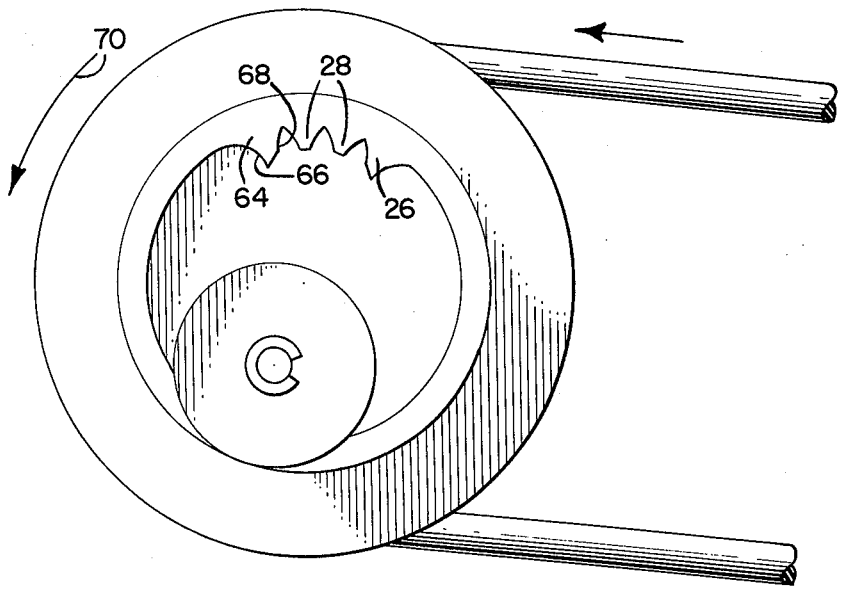

The preferred embodiment as described above is suitable for use with a uni-directional rotating input source. The invention may be adapted for use with a bi-directional rotating input source by adding an additional lead-in tooth 64 to the segment 24 with teeth as shown in FIG. 5. The lead-in tooth 64 is located at one end of the segment 24 with teeth opposite the end that the lead-in tooth 26 is located, has a leading face 66, a trailing face 68, and an asymmetrical profile. The lead-in tooth 26 and the lead-in tooth 64 are asymmetrically pointed in opposite directions from one another. The leading face 66 first contacts the pinion gear 14 during counter-clockwise rotation of the ring gear 12. Counter-clockwise rotation is indicated by the arrow 70 in FIG. 5. When the input rotation is clockwise, the lead-in tooth 26 will initiate engagement with the pinion gear 14 and when the input rotation is reversed to counter-clockwise the lead-in tooth 64 will initiate engagement with the pinion gear 14.

What has been described herein is a gear mechanism in accordance with the present invention suitable for applications requiring jam free periodic output rotation from a rotating input source. The present invention eliminates the possibility of a bridging jam, minimizes the probability of a tooth tip to tooth tip jam. In addition, the relative motion of the tooth tips of the two gears is such that the gears are encouraged to slip in a tooth-face to tooth-face relationship should tooth tip to tooth tip contact occur.

As will be apparent to those skilled in the art, various changes and modifications may be made to the gear mechanism described herein without departing from the scope and spirit of the present invention.

What is claimed is:

1. A gear mechanism comprising
   a rotatable ring gear having along its inner periphery at least one segment without teeth and at least one segment with at least one tooth
   said segment including an asymmetrically pointed lead-in tooth having a leading face and a trailing face; and
   a rotatable pinion gear located within and engageable with the toothed segment of the ring gear and having a plurality of teeth extending radially therefrom.

2. The gear mechanism as set forth in claim 1, in which said toothed segment includes at least one trailing tooth located adjacent the trailing face of the lead-in tooth.

3. The gear mechanism as set forth in claim 2, in which the trailing teeth have shortened addendums.

4. The gear mechanism as set forth in claim 1, in which the lead-in tooth is asymmetrically pointed in the direction of rotation of said ring gear.

5. The gear mechanism as set forth in claim 1, in which the teeth located on the pinion gear are pointed.

6. A gear mechanism comprising
   a rotatable ring gear having along its inner periphery at least one segment without gear teeth and at least one segment with gear teeth including
   an asymmetrically pointed lead-in tooth having a leading face and a trailing face located at each end of the segment with teeth and extending radially inward; and
   a rotatable pinion gear located within and engageable with the segment with gear teeth of the ring gear having a plurality of gear teeth extending radially outward; and
   said ring gear imparting periodic motion to the pinion gear upon rotation of said ring gear.

7. The gear mechanism as set forth in claim 6, in which at least one trailing tooth is located intermediate the lead-in teeth.

8. The gear mechanism as set forth in claim 7, in which the trailing gear teeth have shortened addendums.

9. The gear mechanism as set forth in claim 6, in which the lead-in teeth are asymmetrically pointed in opposite directions.

10. The gear mechanism as set forth in claim 1, in which the gear teeth located on the pinion gear are pointed.

* * * * *